(12) United States Patent
Oshima et al.

(10) Patent No.: US 10,916,122 B2
(45) Date of Patent: Feb. 9, 2021

(54) SENSOR RELAY APPARATUS AND SENSOR RELAY SYSTEM

(71) Applicant: NIPPON TELEGRAPH AND TELEPHONE CORPORATION, Tokyo (JP)

(72) Inventors: Shoichi Oshima, Tokyo (JP); Kenichi Matsunaga, Tokyo (JP); Toshihiko Kondo, Tokyo (JP); Hiroki Morimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/302,053

(22) PCT Filed: May 10, 2017

(86) PCT No.: PCT/JP2017/017654
§ 371 (c)(1),
(2) Date: Nov. 15, 2018

(87) PCT Pub. No.: WO2017/199807
PCT Pub. Date: Nov. 23, 2017

(65) Prior Publication Data
US 2019/0188999 A1    Jun. 20, 2019

(30) Foreign Application Priority Data
May 19, 2016   (JP) .................................. 2016-100149

(51) Int. Cl.
*G08C 15/06*     (2006.01)
*H04L 12/28*    (2006.01)
(Continued)

(52) U.S. Cl.
CPC ............. *G08C 15/06* (2013.01); *G08C 15/00* (2013.01); *H04B 7/15542* (2013.01);
(Continued)

(58) Field of Classification Search
CPC .... G08C 15/06; G08C 15/00; H04B 7/15542; H04L 12/28; H04W 88/04; H04Q 9/00;
(Continued)

(56) References Cited

U.S. PATENT DOCUMENTS

| 8,738,925 | B1 | 5/2014 | Park et al. |
| 2010/0315948 | A1* | 12/2010 | Yi ......................... H04L 47/10 370/235 |

(Continued)

FOREIGN PATENT DOCUMENTS

| CN | 103199900 A | 7/2013 |
| CN | 103309293 A | 9/2013 |

(Continued)

OTHER PUBLICATIONS

"International Search Report," PCT/JP2017/017654 (dated Aug. 8, 2017).

(Continued)

*Primary Examiner* — Amine Benlagsir
(74) *Attorney, Agent, or Firm* — Womble Bond Dickinson (US) LLP

(57) ABSTRACT

In a sensor relay apparatus (10), a communication control unit (13) receives sensor data from a sensor terminal (ST) via a terminal module (11) when a transmission data amount related to the sensor data to be transmitted from the sensor terminal (ST) is equal to or greater than a determination threshold. This can reduce the overhead time taken at the time of the transmission of the sensor data.

4 Claims, 10 Drawing Sheets

(51) Int. Cl.
*H04Q 9/00* (2006.01)
*G08C 15/00* (2006.01)
*H04B 7/155* (2006.01)
*H04W 88/04* (2009.01)

(52) U.S. Cl.
CPC ............... *H04L 12/28* (2013.01); *H04Q 9/00* (2013.01); *H04W 88/04* (2013.01); *H04Q 2209/10* (2013.01); *H04Q 2209/75* (2013.01); *H04Q 2209/823* (2013.01)

(58) Field of Classification Search
CPC .......... H04Q 2209/10; H04Q 2209/75; H04Q 2209/823
See application file for complete search history.

(56) References Cited

U.S. PATENT DOCUMENTS

| | | | | |
|---|---|---|---|---|
| 2011/0134970 A1* | 6/2011 | Yi | ......................... | H04B 7/0626 375/213 |
| 2013/0179540 A1* | 7/2013 | Isozu | .................... | H04L 67/025 709/218 |
| 2014/0051349 A1* | 2/2014 | Watanabe | ............. | H04W 40/12 455/9 |
| 2014/0133388 A1* | 5/2014 | Wager | ..................... | H04B 7/14 370/315 |
| 2015/0230006 A1* | 8/2015 | Sasaki | ..................... | H04Q 9/00 340/870.02 |
| 2017/0006438 A1* | 1/2017 | Wietfeldt | ................ | H04W 4/12 |
| 2018/0123683 A1* | 5/2018 | Wakabayashi | ..... | H04B 7/15528 |

FOREIGN PATENT DOCUMENTS

| | | |
|---|---|---|
| JP | H06-189009 A | 7/1994 |
| JP | 2008-085608 A | 4/2008 |
| JP | 2013-140529 A | 7/2013 |
| JP | 2013-186621 A | 9/2013 |

OTHER PUBLICATIONS

Written Opinion received for PCT Patent Application No. PCT/JP2017/017654, dated Aug. 8, 2017, 7 pages (4 pages of English Translation and 3 pages of Original Document).

Ohkouchi et al., "Proposal of Biological Information Collection Systems of Medical and Health Equipment", DICOMO2014, Symposium, Jul. 2014, 23 pages (12 pages of English Translation and 11 pages of Original Document).

International Preliminary Report on Patentability received for PCT Patent Application No. PCT/JP2017/017654, dated Nov. 29, 2018, 10 pages (6 pages of English Translation and 4 pages of Original Document).

Supplementary European Search Report and Written Opinion received for EP Patent Application No. 17799232.8, dated Sep. 26, 2019, 6 pages.

"Office Action," JP Application No. 2018518237 dated Jan. 15, 2019.

\* cited by examiner

SENSOR RELAY APPARATUS AND SENSOR RELAY SYSTEM

TECHNICAL FIELD

The present invention relates to a sensor relay technology which relays and transfers sensor data detected by a plurality of sensor terminals.

BACKGROUND ART

When collecting sensor data such as biological information from medical equipment or health equipment, a sensor relay system relays and connects sensor data detected by various sensor terminals to a processing apparatus such as a server via a sensor relay apparatus or a communication network. As shown in FIG. 13, in a conventional sensor relay system 50, N sensor terminals #1, #2, . . . , #N (ST) are connected to a sensor relay apparatus 51 via a wireless or wired communication channel or line. The sensor relay apparatus 51 is connected to a processing apparatus 52 such as a server via a communication network NW.

However, in such a conventional technology, when sensor data delivered from the sensor terminals ST are to be transmitted from the sensor relay terminal 51 to the processing apparatus 52, sensor data are relayed and transferred sequentially after a communication link with the processing apparatus 52 is established via the communication network NW upon the delivery of the sensor data to the sensor relay apparatus 51. Hence, when the sensor data to be relayed increases in accordance with the increase in the number of sensor terminals, an overhead time such as the time required to establish a communication link between each sensor terminal and the sensor relay apparatus and the time for the activation/sleep state of the wireless module is increased, and this causes disadvantages of degradation in the transmission data rate relevant to the sensor data.

RELATED ART LITERATURE

Non-Patent Literature

Non-Patent Literature 1: Ohkouchi et al., "Proposal of Biological Information Collection Systems of Medical and Health Equipment", DICOMO2014 Symposium, July 2014.

DISCLOSURE OF INVENTION

Problem to be Solved by the Invention

The present invention has been made to solve the above problem, and has as its object to provide a sensor relay technology capable of reducing the overhead time of the transmission of sensor data.

Means of Solution to the Problem

In order to achieve the above object, a sensor relay apparatus according to the present invention is a sensor relay apparatus that receives sensor data detected by each of a plurality of sensor terminals, and relays and transfers the sensor data to a master apparatus, including a communication control unit configured to receive sensor data from a sensor terminal when a transmission data amount related to the sensor data to be transmitted from the sensor terminal is equal to or greater than a determination threshold.

A sensor relay system according to the present invention is a sensor relay apparatus that receives sensor data detected by each of a plurality of sensor terminals, and relays and transfers the sensor data to a master apparatus, including a communication control unit configured to consecutively relay and transfer, when relaying and transferring, to the master apparatus, sensor data received from the plurality of sensor terminals, sensor data which utilize the same relay communication method among the sensor data to be transmitted from the sensor terminal.

A sensor relay system according to the present invention includes a plurality of sensor terminals, and a sensor relay apparatus configured to receive sensor data detected by each of the plurality of sensor terminals, and relay and transfer the sensor data to a master apparatus, wherein the sensor relay apparatus includes any of the sensor relay apparatuses described above.

Effect of the Invention

According to the present invention, when the transmission data amount of the sensor data is less than the determination threshold, the reception of the sensor data from the sensor terminal ST is postponed, and the sensor data is received when new sensor data is subsequently detected and the transmission data amount of the sensor data becomes equal to or greater than the determination threshold. Hence, it becomes possible to decrease the rate at which the terminal communication method used for data communication with each sensor terminal is switched from one to another, and reduce the overhead time that takes in switching the terminal communication method. Therefore, the transmission data rate related to the sensor data can be suppressed, and the sensor data can be relayed and transferred efficiently even if there is an increase in the number of sensor terminals ST or the types of sensor data.

BEST MODE FOR CARRYING OUT THE INVENTION

Embodiments of the present invention will be described below with reference to the accompanying drawings.

First Embodiment

Figure 1:
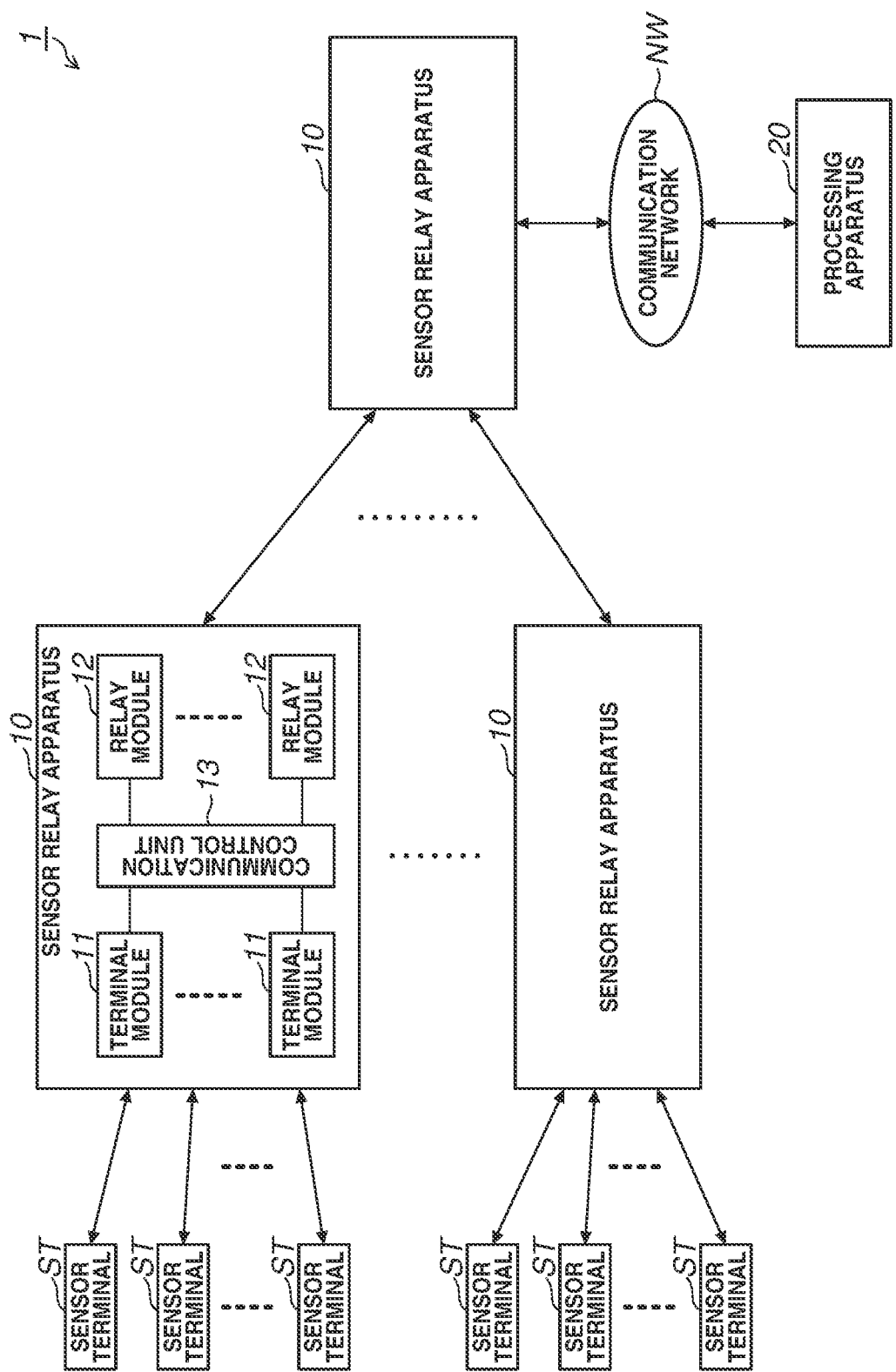
FIG. 1 is a block diagram showing the configuration of a sensor relay system.

First, a sensor relay system 1 according to the first embodiment of the present invention will be described with reference to FIG. 1.

The sensor relay system 1 includes a plurality of sensor terminals ST that are used to collect various kinds of sensor data such as security data acquired from buildings and facilities by sensor devices, biological information detected on a human body by a wearable sensor, and the like, and sensor relay apparatuses 10 that receive, from the sensor terminals ST, the sensor data detected in a target object by the sensor terminals ST and transfer the received data to a processing apparatus 20 via a communication network NW.

The sensor terminals ST include sensor terminals having relatively low sensing functions such as a temperature sensor and acceleration sensor, and sensor terminals having relatively high sensing functions such as cameras for capturing moving images and still images.

The processing apparatus 20 is, as a whole, an information processing apparatus such as a server apparatus and has a function of sensing the status of an object or the occurrence of an event based on sensor data received via the communication network NW.

Each sensor relay apparatus 10 has a relay and transfer function, that is, a sensor data relay and transfer function in which sensor data is relayed and transferred to the processing apparatus 20 by connecting to the sensor terminals ST via the communication channels or lines, receiving sensor data detected and transmitted from the sensor terminals ST, and connecting to the processing apparatus 20 via the communication network NW.

Sensor Relay Apparatus

The arrangement of the sensor relay apparatus 10 according to this embodiment will be described in detail below with reference to FIG. 1.

Each sensor relay apparatus 10 includes, as main functional units, a plurality of terminal modules 11, a plurality of relay modules 12, and a communication control unit 13.

The plurality of terminal modules 11 are formed from communication modules each including a communication circuit which has been designed to execute communication with the sensor terminals ST, and each communication module has an individual terminal communication method.

Each terminal module 11 has a function of receiving sensor data detected by the sensor terminal ST by performing data communication with a subordinate apparatus such as the sensor terminal ST which has the same terminal communication method as the self-apparatus or the other sensor relay apparatus 10.

The plurality of relay modules 12 are formed from communication modules each including a communication circuit which has been designed to execute communication with a master apparatus such as the other sensor relay apparatus 10 or the processing apparatus 20 via the communication network NW, and each relay module provides a communication function based on an individual relay communication method.

Each relay module 12 has a function of transmitting sensor data detected by the sensor terminal ST to a master apparatus by performing data communication with the master apparatus based on a corresponding relay communication method.

The communication control unit 13 has a function of relaying and transferring the sensor data received from the sensor terminal ST via each terminal module 11 to a master apparatus such as the other sensor relay apparatus 10 or the processing apparatus 20 by the predesignated relay module 12, a function of comparing a preset determination threshold and the notified transmission data amount of the sensor data in a transmission request from each sensor terminal ST, and a function of receiving the sensor data from the sensor terminal ST via the terminal module 11 at the point in which the transmission data amount related to the sensor data transmitted from the sensor terminal ST is equal to or greater than the determination threshold as a result of the comparison.

Communication Control Unit

Figure 2:
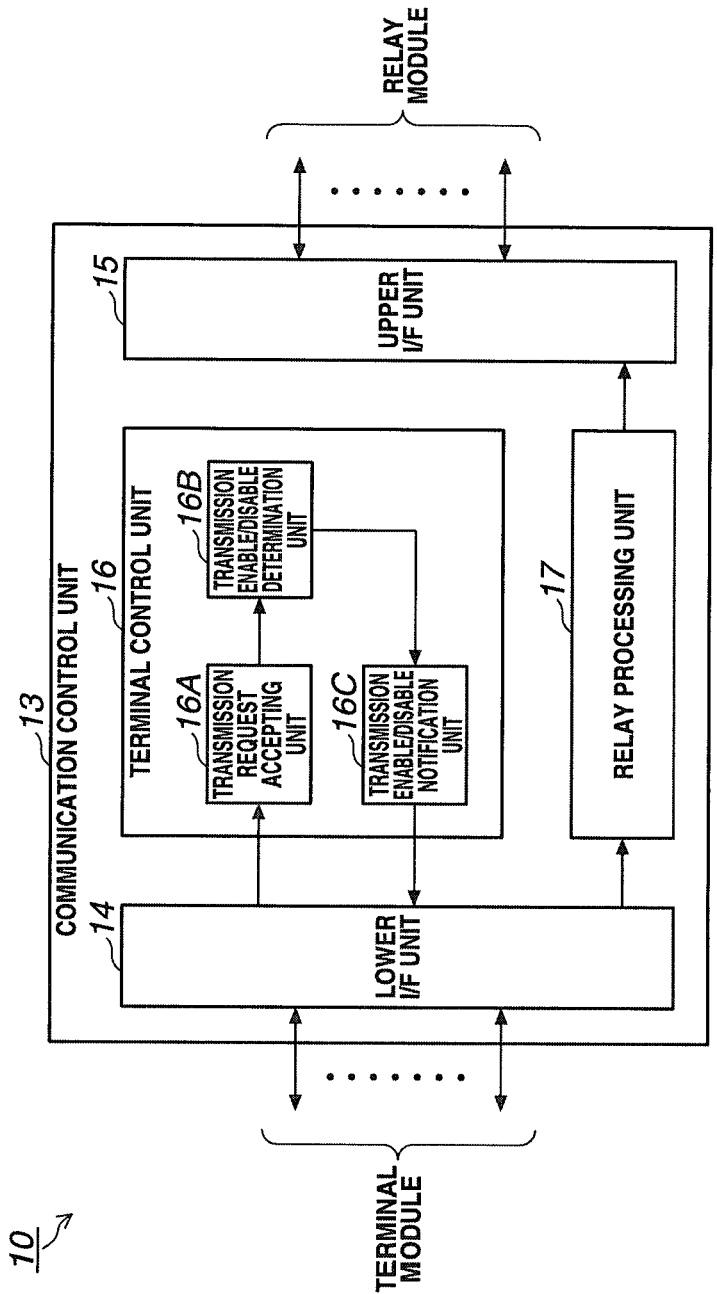
FIG. 2 shows an example of the arrangement of a communication control unit according to the first embodiment.

The arrangement of the communication control unit 13 according to this embodiment will be described next with reference to FIG. 2.

A lower I/F unit 14, an upper I/F unit 15, a terminal control unit 16, and a relay processing unit 17 are provided as main functional units in the communication control unit 13. Among these functional units, the terminal control unit 16 and the relay processing unit 17 are implemented by a central processing unit and a program cooperatively processing information.

The lower I/F unit 14 has a function of exchanging various kinds of data such as sensor data and control data with each sensor terminals ST via the terminal modules 11.

The upper I/F unit 15 has a function of exchanging various kinds of sensor data and control data with a master apparatus via the relay modules 12.

The relay processing unit 17 has a function of temporarily accumulating sensor data received from the sensor terminal ST via the lower I/F unit 14 and a function of relaying and transferring the accumulated sensor data to the master apparatus via the upper I/F unit 15.

The terminal control unit 16 has a function of controlling sensor data transmission processing from the sensor terminals ST via the lower I/F unit 14.

The terminal control unit 16 includes, as main processing units, a transmission request accepting unit 16A, a transmission enable/disable determination unit 16B, and a transmission enable/disable notification unit 16C.

The transmission request accepting unit 16A has a function of accepting a transmission request from the sensor terminal ST and obtaining the transmission data amount included in the transmission request.

The transmission enable/disable determination unit 16B has a function of comparing the transmission data amount obtained by the transmission request accepting unit 16A with a preset determination threshold, and a function of determining, based on whether the transmission data amount has reached the determination threshold, whether to enable the transmission of sensor data from the transmission request source sensor terminal ST.

The transmission enable/disable notification unit 16C has a function of notifying the transmission request source sensor terminal ST of the result of the transmission enable/disable determination by the transmission enable/disable determination unit 16B.

Sensor Terminal

Figure 3:
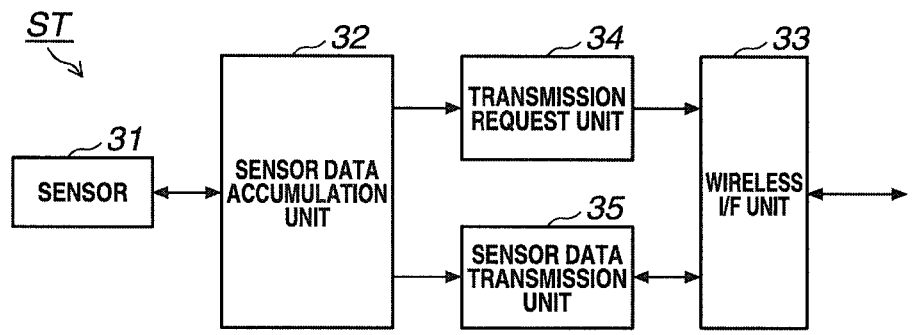
FIG. 3 shows an example of the arrangement of a sensor terminal according to the first embodiment.

The arrangement of each sensor terminal ST according to this embodiment will be described next with reference to FIG. 3.

The sensor terminal ST includes, as the main functional units, a sensor 31, a data buffer 32, a wireless I/F unit 33, a transmission request unit 34, and a sensor data transmission unit 35. Among these functional units, the transmission request unit 34 and the sensor data transmission unit 35 are implemented by a central processing unit and a program cooperatively processing information.

The sensor 31 is a sensor for sensing various kinds of sensor data such as security data and biological information.

The data buffer 32 is a storage device such as a semiconductor memory or the like and has a function of temporarily storing sensor data detected by the sensor 31.

The wireless I/F unit 33 has a function of exchanging various kinds of data such as sensor data and control data by performing wireless data communication with the sensor relay apparatus 10 based on a predetermined terminal communication method.

The transmission request unit 34 has a function of notifying, from the wireless I/F unit 33, the sensor relay apparatus 10 of a transmission request which includes the transmission data amount indicating the data amount of the sensor data to be transmitted, each time new sensor data is detected by the sensor 31 and is stored in the data buffer 32. Assume that the transmission data amount is preset based on the data length of the sensor data detected by the sensor 31, the sensing interval, the terminal communication method used in the sensor terminal ST, and the like.

The sensor data transmission unit 35 has a function of reading, from the data buffer 32, the sensor data corresponding to the transmission data amount and transmitting the sensor data from the wireless I/F unit 33 to the sensor relay apparatus 10 in accordance with the transmission enable notification received from the sensor relay apparatus 10 via the wireless I/F unit 33.

Operation of First Embodiment

The operation of each sensor relay apparatus 10 according to this embodiment will be described next with reference to FIG. 4.

Figure 4:
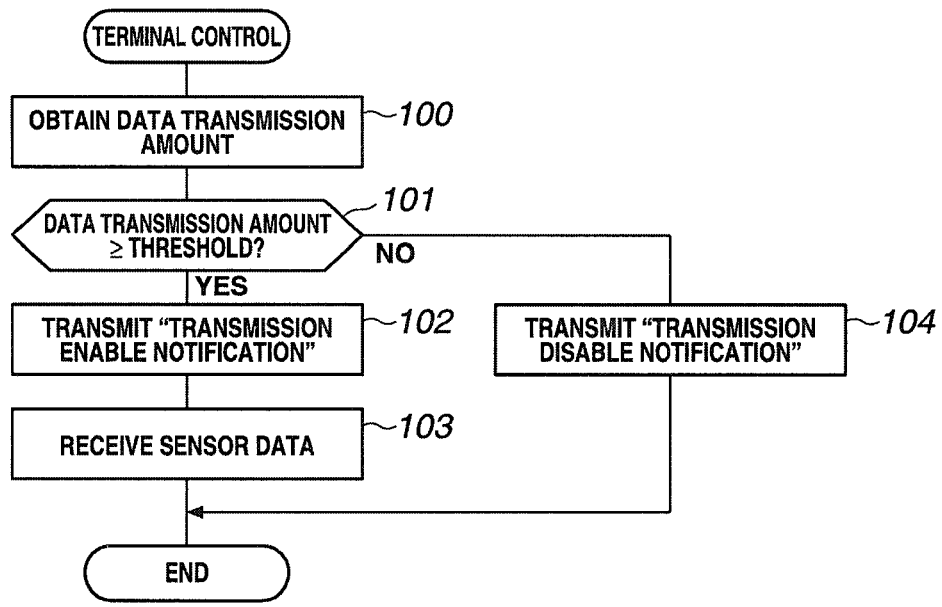
FIG. 4 is a flowchart showing terminal control processing of a sensor relay apparatus.

When sensor data is to be received from the corresponding sensor terminal ST, the communication control unit 13 of the sensor relay apparatus 10 executes terminal control processing in accordance with the procedures shown in FIG. 4.

First, upon receiving a transmission request from the sensor terminal ST via the terminal module 11, the communication control unit 13 obtains (step 100) the data transmission amount from the transmission request and compares (step 101) the data transmission amount with the determination threshold.

As a result, when the transmission data amount is equal to or greater than the determination threshold (YES in step 101), the communication control unit 13 transmits a transmission enable notification to the sensor terminal ST via the terminal module 11 (step 102).

The sensor terminal ST which received the transmission enable notification transmits the sensor data corresponding to the data transmission amount to the sensor relay apparatus 10.

The communication control unit 13 receives (step 103), via the terminal module 11, the sensor data from the sensor terminal ST to which it had transmitted the transmission enable notification and ends the series of terminal control processing operations.

On the other hand, when the transmission data is less than the determination threshold (NO in step 101), the communication control unit 13 transmits (step 104) a transmission disable notification to the sensor terminal ST via the terminal module 11, and ends the series of terminal control processing operations.

The sensor terminal ST which received the transmission disable notification will stop the transmission of the sensor data and will subsequently transmit a transmission request to the sensor relay apparatus 10 again at the point in which new sensor data is detected.

Figure 5:
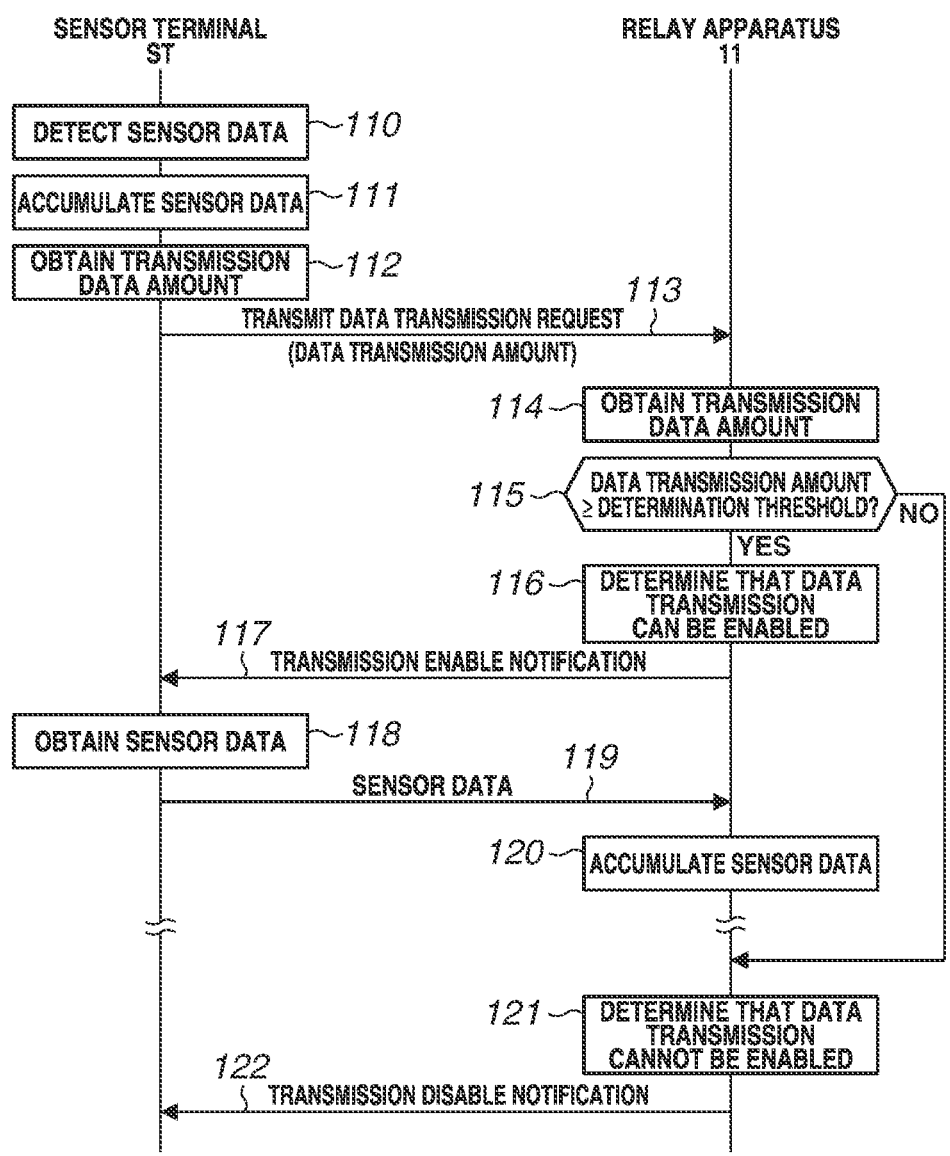
FIG. 5 is a sequence chart showing a sensor data transmission operation according to the first embodiment.

The more specific terminal control processing operations of the sensor terminal ST and the sensor relay apparatus 10 according to this embodiment will be described with reference to FIG. 5.

First, in the sensor terminal ST, when the sensor 31 detects (step 110) new sensor data and stores (step 111) the sensor data in the data buffer 32, the transmission request unit 34 obtains (step 112) the transmission data amount, which indicates the data amount to the sensor data to be transmitted and is stored in the data buffer 32, and wirelessly transmits (step 113) a transmission request including the obtained transmission data amount to the sensor relay apparatus 10 via the wireless I/F unit 33.

In the sensor relay apparatus 10, the communication control unit 13 causes the transmission request accepting unit 16A to accept the transmission request from the sensor terminal ST received via the terminal module 11 and obtain (step 114) the transmission data amount included in the transmission request.

Subsequently, the communication control unit 13 causes the transmission enable/disable determination unit 16B to compare (step 115) the transmission data amount obtained by the transmission request accepting unit 16A and the preset determination threshold.

As a result, when the transmission data amount is equal to or greater than the determination threshold (YES in step 115), the communication control unit 13 determines (step 116), via the transmission enable/disable determination unit 16B, to enable the transmission of sensor data from the transmission request source sensor terminal ST, and transmits (step 117), via the transmission enable/disable notification unit 16C, a transmission enable notification to the transmission request source sensor terminal ST.

When a transmission enable notification is received from the sensor relay apparatus 10, the sensor terminal ST obtains (step 118), from the data buffer 32, the sensor data corresponding to the transmission data amount, and wirelessly transmits (step 119) the sensor data to the sensor relay apparatus 10 via the wireless I/F unit 33.

In response to this, the sensor relay apparatus 10 temporarily accumulates (step 120), in the relay processing module 17, the sensor data received from the sensor terminal ST via the communication control unit 13, and the series of sensor data transmission operations end.

On the other hand, when the transmission data amount is less than the determination threshold (NO in step 115), the communication control unit 13 determines (step 121), via the transmission enable/disable determination unit 16B, to disable the transmission of sensor data from the transmission request source sensor terminal ST, and transmits (step 122), via the transmission enable/disable notification unit 16C, a transmission disable notification to the transmission request source sensor terminal ST, and the series of sensor data processing operations end.

When the transmission disable notification is received, the sensor terminal ST stops the transmission of the sensor data stored in the data buffer 32. Subsequently, the sensor terminal ST will transmit a transmission request to the sensor relay apparatus 10 at the point in which new sensor data is detected. Hence, the sensor data is stored in the data buffer 32 of the sensor terminal ST until the transmission enable notification is received from the sensor relay apparatus 10.

Figure 6A:
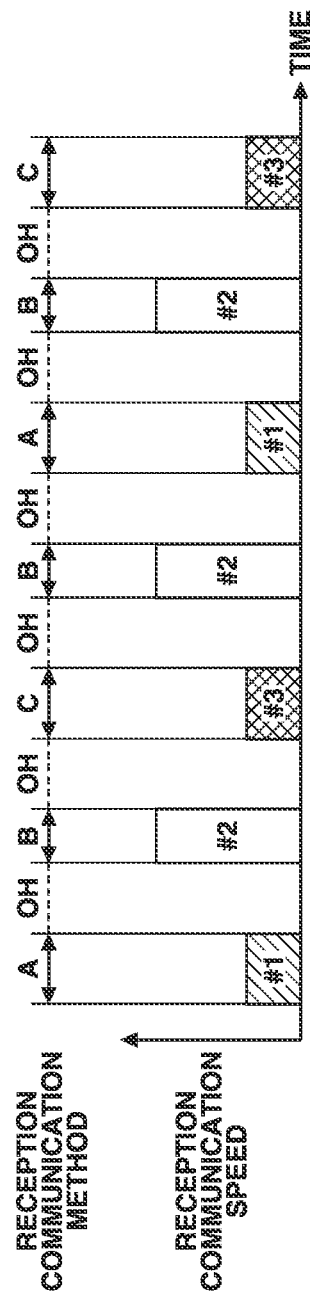
FIG. 6 shows an example of sensor data transmission from the sensor terminal to the sensor relay apparatus.

In a case in which such terminal control operations are not performed in the sensor relay apparatus 10, a sensor data will be transmitted to the sensor relay apparatus 10 from each sensor terminal ST each time the sensor terminal ST detects new sensor data. Accordingly, as exemplified in FIG. 6A, in a case in which a sensor terminal ST#1 transmits sensor data that utilizes a terminal communication method A and a sensor terminal ST#2 transmits sensor data that utilizes a terminal communication method B, the sensor relay apparatus is required to switch from the terminal module 11 supporting the terminal communication method A to the terminal module 11 supporting the terminal communication method B and vice versa, each time the sensor data transmission source is changed. Hence, this time required for the switching operation is generated as an overhead time OH at the same frequency as the sensing of new sensor data.

Figure 6B:
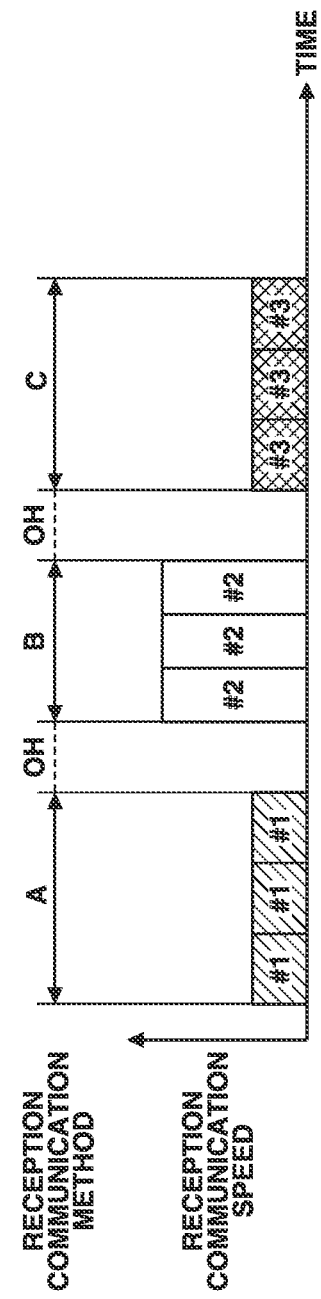

On the other hand, in a case in which the terminal control operations shown in FIG. 4 are performed in the sensor relay apparatus 10, sensor data of an amount equal to or greater than the determination threshold is transmitted all together from each sensor terminal ST instead of being individually transmitted for each newly detected sensor data. Thus, as exemplified in FIG. 6B, sensor data corresponding to a plurality of sensing operations, that is, three sensing operations in this case, are transmitted all together from the sensor terminal ST#1 based on the terminal communication method A, and sensor data corresponding to a plurality of sensing operations, that is, three sensing operations in this case, are transmitted all together from the sensor terminal ST#2 based on the terminal communication method B. Therefore, the rate at which the terminal module 11 is switched to the terminal module 11 with a different terminal communication method is reduced to as often as once every three sensor data, and the overhead time OH is reduced.

Effect of First Embodiment

In this manner, this embodiment is arranged so that the communication control unit 13 in the sensor relay apparatus 10 receives the sensor data from the sensor terminal ST when the transmission data amount related to the sensor data, which is to be transmitted from the sensor terminal ST, is equal to or greater than the determination threshold value.

More specifically, the embodiment is arranged so that the communication control unit 13 will determine whether to enable or disable the sensor data transmission by comparing the notified transmission data amount of the sensor data in the transmission request from the sensor terminal ST and the determination threshold.

As a result, in a case in which the transmission data amount of the sensor data is less than the determination threshold, the reception of sensor data from the sensor terminal ST is postponed, and the sensor data is received only after new sensor data is detected and the transmission data amount of the sensor data becomes equal to or greater than the determination threshold. This can reduce the rate at which the terminal communication method to be used for the data communication with the sensor terminal ST is switched from one to another, thereby reducing in the overhead time occurred by the switching operation of the terminal communication method. Therefore, it is possible to suppress a reduction in the transmission data rate related to the sensor data, and efficiently relay and transfer the sensor data even when there is an increase in the number of the sensor terminals ST and the kinds of sensor data.

Second Embodiment

A sensor relay apparatus 10 according to the second embodiment of the present invention will be described next.

The first embodiment exemplified a case in which the communication control unit 13 of the sensor relay apparatus 10 performed a transmission enable/disable determination operation related to the sensor data. The second embodiment will describe a case in which the transmission enable/disable determination related to the sensor data is performed by each sensor terminal ST.

Figure 7:
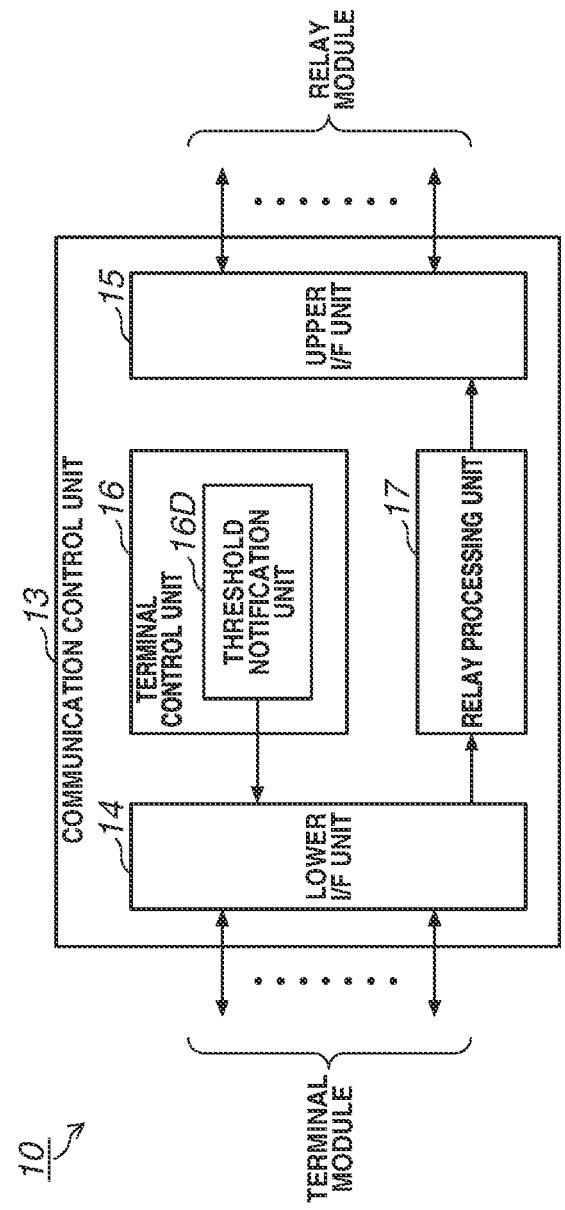
FIG. 7 shows an example of the arrangement of a communication control unit according to the second embodiment.

That is, in this embodiment, a communication control unit 13 includes, as shown in FIG. 7, a threshold notification unit 16D instead of the transmission request accepting unit 16A, the transmission enable/disable determination unit 16B, and the transmission enable/disable notification unit 16C.

The threshold notification unit 16D has a function of notifying the sensor terminal ST which is under its control via a lower I/F unit 14 of a preset determination threshold and causing the sensor terminal ST to determine whether to enable or disable the transmission of the sensor data based on a result obtained from comparing a transmission data amount and a determination threshold.

The communication control unit 13 includes a central processing unit (CPU) and a storage device, and is arranged so that the function of the aforementioned threshold notification unit 16D is implemented by the CPU processing information in accordance with a computer program stored in the storage device.

Note that other components related to the sensor relay apparatus 10 are the same as those in the first embodiment.

Figure 8:
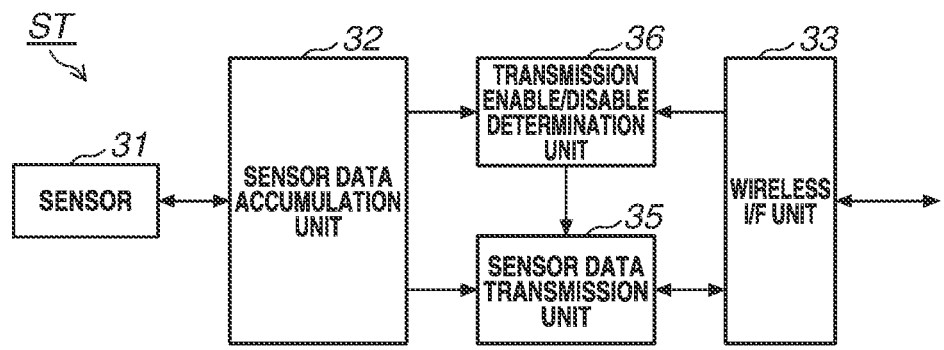
FIG. 8 shows an example of the arrangement of a sensor terminal according to the second embodiment.

On the other hand, in this embodiment, the sensor terminal ST includes, as shown in FIG. 8, a transmission enable/disable determination unit 36 instead of the transmission request unit 34 according to the first embodiment.

The transmission enable/disable determination unit 36 has a function of registering the determination threshold received from the sensor relay apparatus 10 via a wireless I/F unit 33.

The transmission enable/disable determination unit 36 also has a function of comparing, each time new sensor data is detected by a sensor 31 and is stored in a data buffer 32, the registered determination threshold with a transmission data amount indicating the data amount of the sensor data to be transmitted, and a function of determining whether to enable or disable the transmission of the sensor data based on whether the transmission data amount has reached the determination threshold.

A sensor data transmission unit 35 includes a communication circuit and has a function of reading out the sensor data corresponding to the transmission data amount from the data buffer 32 in accordance with the determination to enable the transmission of the sensor data by the transmission enable/disable determination unit 36 and transmitting the sensor data from the wireless I/F unit 33 to the sensor relay apparatus 10. Note that other components related to the sensor terminal ST are the same as those in the first embodiment.

Operation of Second Embodiment

Operations of the sensor terminal ST and the sensor relay apparatus 10 according to this embodiment will be described next with reference to FIG. 9.

Figure 9:
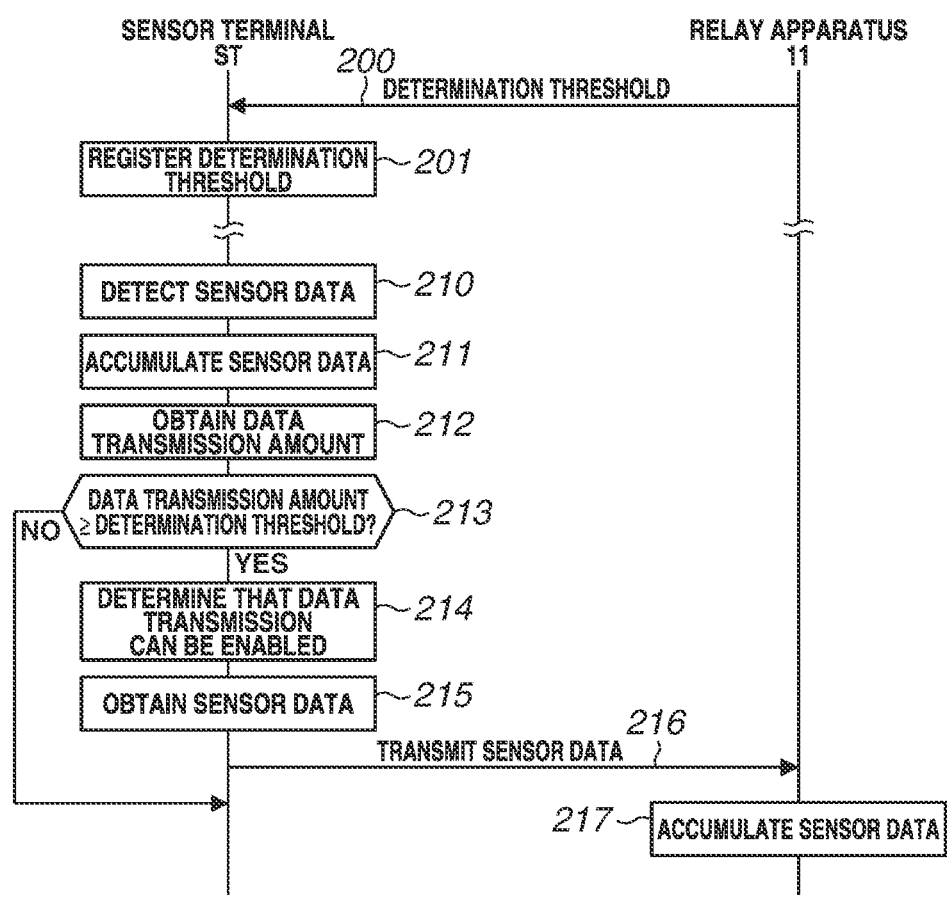
FIG. 9 is a sequence chart showing a sensor data transmission operation according to the second embodiment.

When sensor data is to be transmitted from the sensor terminal ST to the sensor relay apparatus 10, the sensor terminal ST and the sensor relay apparatus 10 execute a sensor data transmission operation in accordance with the procedures shown in FIG. 9.

Prior to the transmission of the sensor data from the sensor terminal ST, the communication control unit 13 of the sensor relay apparatus 10 notifies (step 200) the sensor terminal ST, which is under its control via the lower I/F unit 14, of the preset determination threshold by the threshold notification unit 16D.

In response to this, the sensor terminal ST causes the transmission enable/disable determination unit 36 to register (step 201) the determination threshold received from the sensor relay apparatus 10 via the wireless I/F unit 33. In the following processes, the sensor terminal ST will determine whether to enable or disable the transmission of the sensor data based on the newly registered determination threshold.

Subsequently, in the sensor terminal ST, when the sensor 31 detects (step 210) new sensor data and stores (step 211) the sensor data in the data buffer 32, the transmission enable/disable determination unit 36 obtains (step 212) the transmission data amount indicating the transmission data amount of the sensor data to be transmitted from the data buffer 32 and compares (step 213) the obtained transmission data amount with the registered determination threshold.

Here, when the transmission data amount is equal to or greater than the determination threshold (YES in step 213), the transmission enable/disable determination unit 36 determines (step 214) that the transmission of the sensor data can be enabled. On the other hand, when the transmission data amount is less than the determination threshold (NO in step 213), the sensor terminal ST stops the transmission of the sensor data. Subsequently, the sensor terminal ST executes the transmission enable/disable determination again at the point in which new sensor data is detected. Hence, the sensor data is stored in the data buffer 32 of the sensor terminal ST until it is determined that the transmission of the sensor data can be enabled.

In response to the transmission enable/disable determination unit 36 determining that the transmission of the sensor data can be enabled, the sensor data transmission unit 35 obtains (step 215) the sensor data corresponding to the transmission data amount from the data buffer 32 and wirelessly transmits (step 216) the obtained sensor data to the sensor relay apparatus 10 via the wireless I/F unit 33.

In response to this, the sensor relay apparatus 10 receives the sensor data from the sensor terminal ST via the communication control unit 13 and temporarily accumulates (step 217) the sensor data in the relay processing unit 17, and the series of sensor data transmission operations end.

Effect of Second Embodiment

In this manner, this embodiment is arranged so that the threshold notification unit 16D of the communication control unit 13 in the sensor relay apparatus 10 notifies the sensor terminal ST of the determination threshold and causes the sensor terminal ST to determine whether to enable or disable the transmission of the sensor data based on the result of comparing the transmission data amount and the determination threshold.

As a result, the sensor terminal ST performs the transmission enable/disable determination of the sensor data based on the result of comparing of the transmission data amount and the determination threshold. This allows the exchange of control data such as a transmission request, a transmission enable notification/transmission disable notification, and the like between the sensor terminal ST and the sensor relay apparatus 10 to be omitted, and thus the power consumption and the wireless communication traffic required for the control data exchange can be reduced.

Third Embodiment

A sensor relay system 1 according to the third embodiment of the present invention will be described next.

The first embodiment described a case in which a plurality of sensor data were transmitted all together from the sensor terminal ST to the sensor relay apparatus 10. This embodiment will describe a case in which a plurality of sensor data are relayed and transferred all together from a sensor relay apparatus 10 to a master apparatus such as another sensor relay apparatus 10 or a processing apparatus 20.

That is, in this embodiment, when relaying and transferring sensor data received from a sensor terminal ST to a master apparatus, a communication control unit 13 of the sensor relay apparatus 10 has a function of consecutively relaying and transferring, among the sensor data, a plurality of sensor data which are to be relayed and transferred based on the same relay communication method. Note that other components related to the sensor relay apparatus 10 and the components related to the sensor terminal ST are the same as those in the first or the second embodiment.

Figure 10:
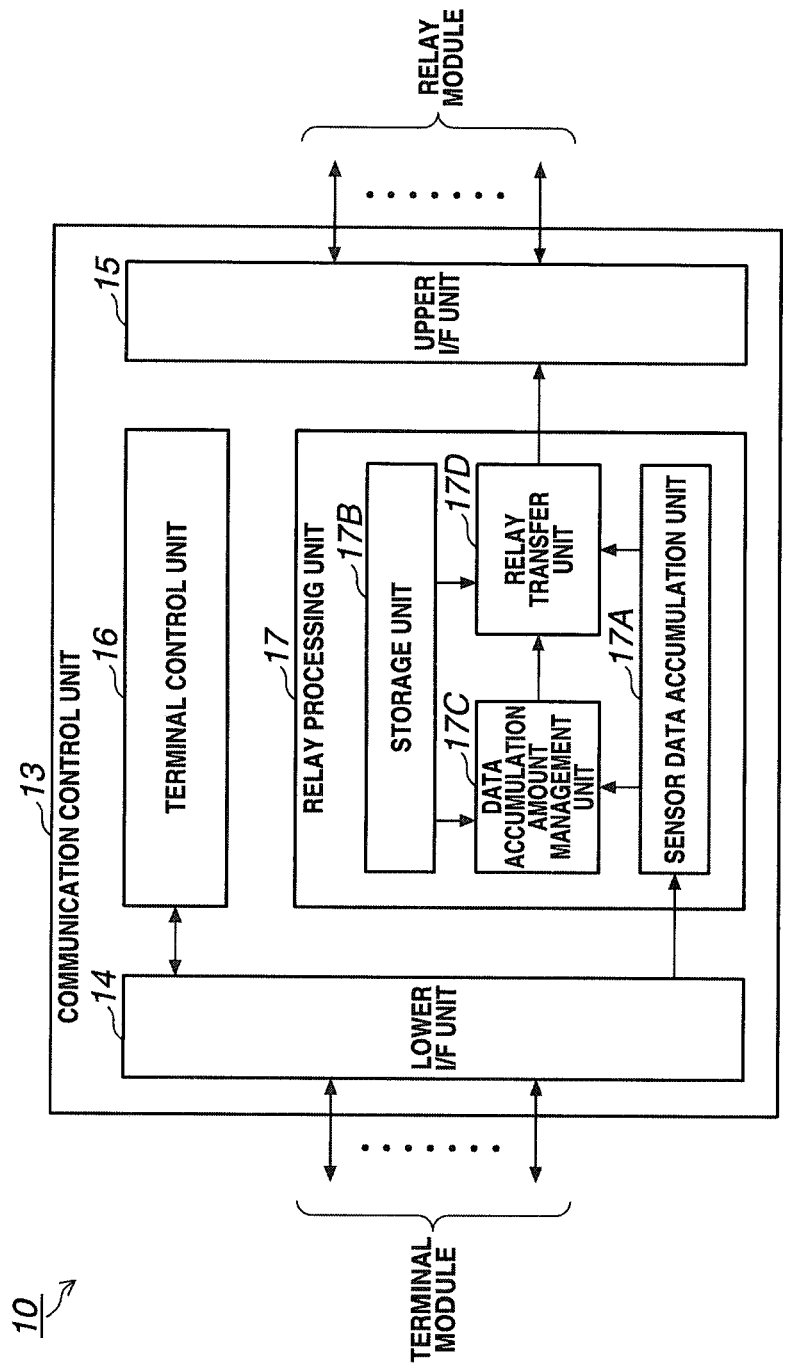
FIG. 10 shows an example of the arrangement of a communication control unit according to the third embodiment.

In the third embodiment, a relay processing unit 17 of the sensor relay apparatus 10 includes, as shown in FIG. 10, a sensor data accumulation unit 17A, a storage unit 17B, a data accumulation amount management unit 17C, and a relay transfer unit 17D.

The sensor data accumulation unit 17A is a storage device such as a semiconductor memory and has a function of temporarily accumulating the sensor data received from the sensor terminal ST via a lower I/F unit 14.

The storage unit 17B is a storage device such as a semiconductor memory and has a function of storing various kinds of setting data for a preset relay and transfer processing operation. As such setting data, there is a communication standard association list designating the specific relay communication method, which is to be used when relaying and transferring the sensor data of the sensor terminal ST to a master apparatus, for each sensor terminal ST which is subordinate to and is to be connected via the lower I/F unit 14. The relay communication method is preset in accordance with, for example, the sensor data transfer path from the sensor relay apparatus 10 to the master apparatus.

The data accumulation amount management unit 17C has a function of managing, based on the communication standard association list of the storage unit 17B and for each relay communication method, the data accumulation amount related to the sensor data accumulated in the sensor data accumulation unit 17A.

The relay transfer unit 17D has a function of obtaining, from the data accumulation amount management unit 17C, the data accumulation amount of sensor data related to each relay communication method and selecting a relay communication method that has a data accumulation amount equal to or greater than a predetermined amount, and a function of reading sensor data related to the selected relay communication method and corresponding to the predetermined amount and relaying and transferring the read sensor data from a relay module 12 to a master apparatus via the upper I/F unit 15.

The relay processing unit 17 of the sensor relay apparatus 10 includes a central processing unit (CPU) and a storage device in the same manner as those in the first embodiment, and is arranged so that the functions of the data accumulation amount management unit 17C and the relay transfer unit 17D are implemented by the CPU processing information in accordance with a computer program stored in the storage device.

Operation of Third Embodiment

The operation of the sensor relay apparatus 10 according to this embodiment will be described next with reference to FIG. 11.

Figure 11:
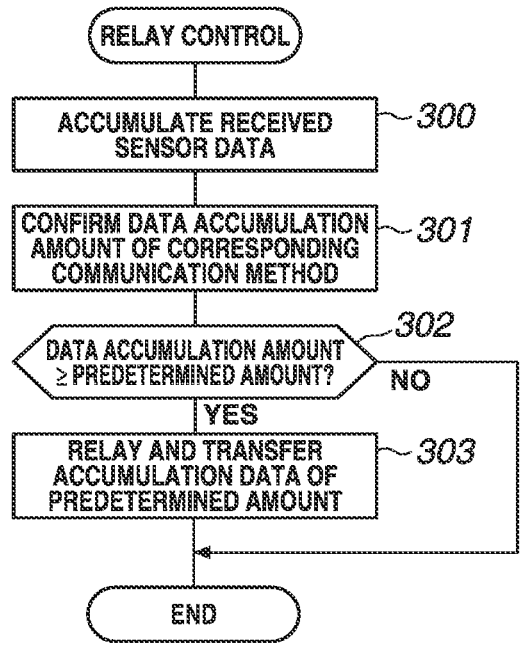
FIG. 11 is a flowchart showing relay control processing of a sensor relay apparatus.

The communication control unit 13 of the sensor relay apparatus 10 executes the relay control processing of FIG. 11 when relaying and transferring sensor data received from the sensor terminal ST to the master apparatus.

First, each time a sensor data is received from the sensor terminal ST, the communication control unit 13 temporarily accumulates (step 300) the sensor data, searches, among the accumulated sensor data, for a sensor data which is to be relayed and transferred by the same relay communication method as the newly accumulated sensor data, and confirms (step 301) the data accumulation amount of the sensor data with the same relay communication method. Assume that each relay communication method to be used when relaying and transferring the corresponding sensor data has been preset in accordance with the transfer path of the sensor data.

Here, in a case in which the data accumulation amount of the sensor data related to the same relay communication method is equal to or greater than predetermined amount (YES in step 302), the communication control unit 13 reads out the sensor data related to the same relay communication method for a predetermined amount, relays and transfers (step 303) the read sensor data from the relay module 12 to the master apparatus, and ends the series of relay control processing operations.

On the other hand, in a case in which the data accumulation amount of the sensor data related to the same relay communication method is less than the predetermined amount (NO in step 302), the communication control unit 13 ends the series of relay control processing operations. This postpones the relay and transfer operation of the sensor data related to the same relay communication method.

Figure 12:
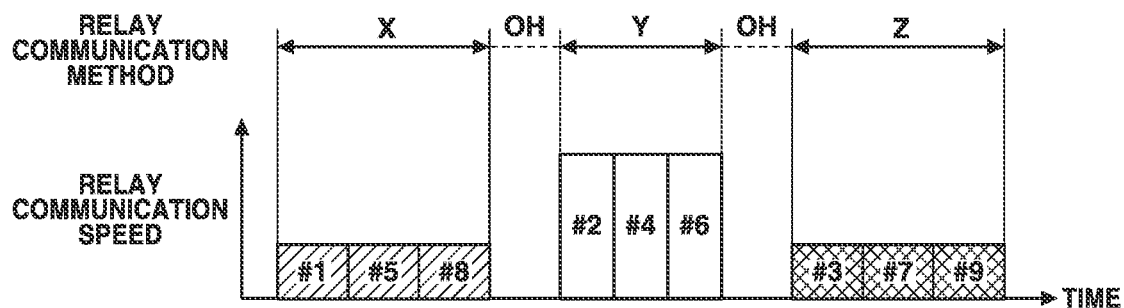
FIG. 12 shows an example of sensor data relay transfer from the sensor relay apparatus to a master apparatus.
Figure 13:
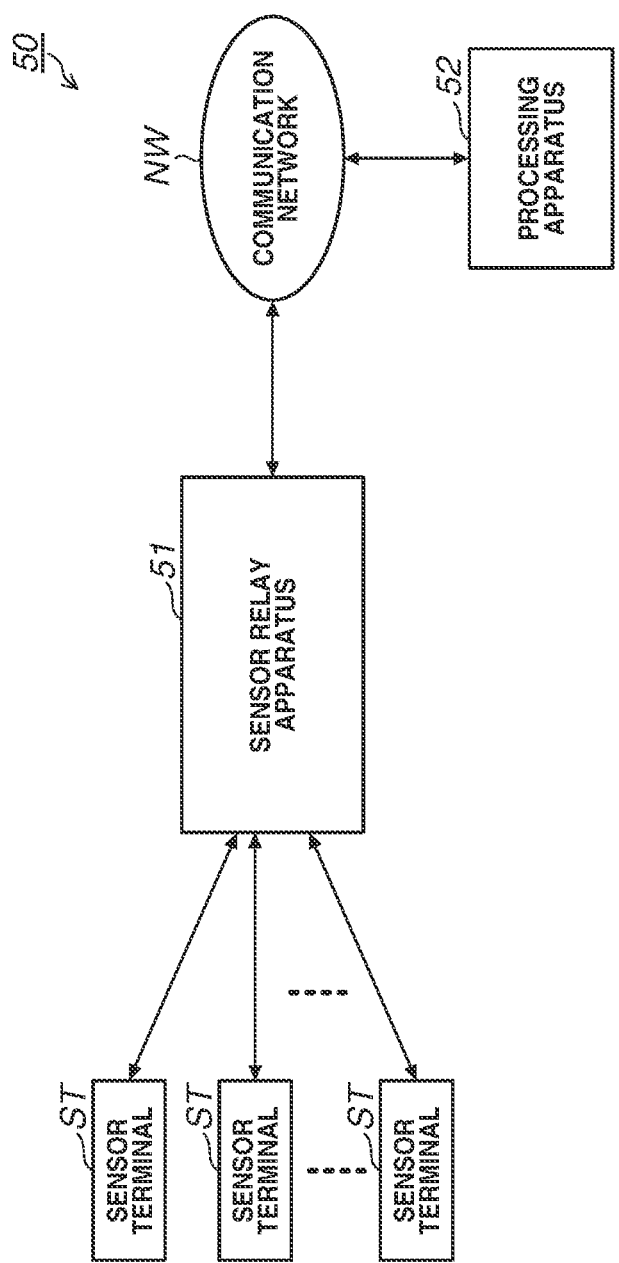
FIG. 13 is a block diagram showing a conventional sensor relay system.

In a case in which the relay control operation of FIG. 11 is performed, instead of relaying and transferring each time the sensor data is newly detected, sensor data of the predetermined amount related to the same relay communication method will be consecutively relayed and transferred from the sensor relay apparatus 10. Thus, for example, as shown in FIG. 12, three sets of sensor data from sensor terminals ST#1, ST#5, and ST#8 which are to be relayed and transferred by a relay communication method X are continuously relayed and transferred here, and three sets of sensor data from sensor terminals ST#2, ST#4, and ST#6 which are to be relayed and transferred by a relay communication method Y are consecutively relayed and transferred. Therefore, the rate of switching operation to the relay module 12 of a different relay communication method can be decreased, for example, to as often as once for every three sets of sensor data, and an overhead time OH can be reduced.

Note that although FIG. 11 exemplified a case in which the relay communication method of a newly accumulated sensor data was used as the relay communication method for relaying and transferring the sensor data, the present invention is not limited to this. A relay communication method with the largest data accumulation amount among the accumulated sensor data may be selected as the target of the relay and transfer operation, or for example, a target relay communication method may be selected based on a preset levels of priority.

Also, although FIG. 11 exemplified a case in which the start timing of the relay and transfer operation was set to the point in which new sensor data is accumulated, the present invention is not limited to this. The relay and transfer operation may be started autonomously at a predetermined interval.

Effect of Third Embodiment

In this manner, this embodiment is arranged so that when the communication control unit 13 in the sensor relay apparatus 10 is to relay and transfer the sensor data received from the sensor terminals ST to a master apparatus, a plurality of sensor data to be relayed and transferred based on the same relay communication method, of the sensor data, are consecutively relayed and transferred.

As a result, the plurality of sensor data to be relayed and transferred by the same relay communication method are consecutively relayed and transferred to the master apparatus. This can reduce the rate at which the communication method used for data communication with each sensor terminal ST is switched from one to another, and reduce the overhead time occurred by the switching of the relay communication method. Therefore, it is possible to suppress the degradation of relay and transfer data rate related to the sensor data and efficiently relay and transfer the sensor data even when there is an increase in the number of the sensor terminals ST and the kinds of sensor data.

Extension of Embodiments

The present invention has been explained above by referring to the embodiments, but the present invention is not limited to the above embodiments. Various changes understandable by those skilled in the art can be made on the arrangements and details of the present invention without departing from the scope of the invention. In addition, these embodiments can be carried out in the form of an arbitrary combination without any contradiction.

EXPLANATION OF THE REFERENCE NUMERALS AND SIGNS

1 . . . sensor relay system, 10 . . . sensor relay apparatus, 11 . . . terminal module, 12 . . . relay module, 13 . . . communication control unit, 14 . . . lower I/F unit, 15 . . . upper I/F unit, 16 . . . terminal control unit, 16A . . . transmission request accepting unit, 16B . . . transmission enable/disable determination unit, 16C . . . transmission enable/disable notification unit, 16D . . . threshold notification unit, 17 . . . relay processing unit, 17A . . . sensor data accumulation unit, 17B . . . storage unit, 17C . . . data accumulation amount management unit, 17D . . . relay transfer unit, 20 . . . processing apparatus, 31 . . . sensor, 32 . . . data buffer, 33 . . . wireless I/F unit, 34 . . . transmission request unit, 35 . . . sensor data transmission unit, 36 . . . transmission enable/disable determination unit, ST . . . sensor terminal, NW . . . communication network

The invention claimed is:

1. A sensor relay apparatus that receives sensor data detected by each of a plurality of sensor terminals, and relays and transfers the sensor data to one of a plurality of master apparatuses, comprising:
   a plurality of terminal modules, each of the plurality of terminal modules configured to execute communication with one of the plurality of sensor terminals,
   a sensor data accumulation device configured to store the sensor data received from the plurality of sensor terminals via the plurality of terminal modules,
   a memory configured to store a communication standard association list that designates relay communication methods for relaying and transferring the sensor data stored in the sensor data accumulation device to the one of the plurality of master apparatuses in accordance with sensor data transfer paths to the one of the plurality of master apparatuses,
   a data accumulation amount management circuit configured to manage, based on the communication standard association list stored in the memory and for each of the relay communication methods, a data accumulation amount related to the sensor data stored in the sensor data accumulation device,
   a plurality of relays, each of the plurality of relays configured to provide a communication function based on one of the relay communication methods, and
   a communication controller including a terminal controller and a relay transfer circuit, the communication controller configured to compare transmission data amount received from the one of the plurality of sensor terminals via one of the plurality of terminal modules with a determination threshold, and if the transmission data amount is equal to or greater than the determination threshold, allow the one of the plurality of sensor terminals to transmit the sensor data, via the one of the plurality of terminal modules and store the sensor data received from the one of the plurality of sensor terminals in the sensor data accumulation device, if not, not allow the one of the plurality of sensor terminals to transmit the sensor data, and the relay transfer circuit configured to obtain the data accumulation amount of the sensor data related to the each of the relay communication methods from the data accumulation amount management circuit, select a relay communication method of the relay communication methods based on the data accumulation amount of the sensor data related to the each of the relay communication methods, and consecutively relay and transfer, to the one of the plurality of master apparatuses, the sensor data received from different ones of the plurality of sensor terminals and to be relayed and transmitted based on a common relay communication method among the sensor data stored in the sensor data accumulation device to the one of the plurality of master apparatuses, utilizing one of the plurality of relays, wherein the common relay communication method is selected based on the data accumulation amount of the sensor data related to the each of the relay communication methods.

2. The sensor relay apparatus according to claim 1, wherein the communication controller further comprises
   a transmission request accepting circuit configured to accept a transmission request from the each of the plurality of sensor terminals and obtain the transmission data amount included in the transmission request, and
   a transmission enable/disable determination circuit configured to determine whether to enable or disable transmission of the sensor data from the each of the plurality of sensor terminals by comparing the transmission data amount obtained and the determination threshold.

3. The sensor relay apparatus according to claim 1, wherein the communication controller further comprises a threshold notification circuit configured to notify the each of the plurality of sensor terminals of the determination threshold and cause the each of the plurality of sensor terminals to determine whether to enable or disable transmission of the sensor data based on a result of comparing of the transmission data amount and the determination threshold.

4. A sensor relay apparatus that receives sensor data detected by each of a plurality of sensor terminals, and relays and transfers the sensor data to one of a plurality of master apparatuses, comprising:
   a sensor data accumulation device configured to store the sensor data received from the plurality of sensor terminals,
   a memory configured to store a communication standard association list that designates relay communication methods for relaying and transferring the sensor data stored in the sensor data accumulation device to the one of the plurality of master apparatuses in accordance with sensor data transfer paths to the one of the plurality of master apparatuses,
   a data accumulation amount management circuit configured to manage, based on the communication standard association list stored in the memory and for each of the relay communication methods, a data accumulation amount related to the sensor data stored in the sensor data accumulation device,
   a plurality of relays, each of the plurality of relays configured to provide a communication function based on one of the relay communication methods, and
   a communication controller including a relay transfer circuit, the relay transfer circuit configured to obtain the data accumulation amount of the sensor data related to the each of the relay communication methods from the data accumulation amount management circuit, select a relay communication method of the relay communication methods based on the data accumulation amount of the sensor data related to the each of the relay communication methods, and consecutively relay and transfer, to the one of the plurality of master apparatuses, the sensor data received from different ones of the plurality of sensor terminals and to be relayed and transmitted based on a common relay communication method among the sensor data stored in the sensor data accumulation device to the one of the plurality of master apparatuses, utilizing one of the plurality of relays, wherein the common relay communication method is selected based on the data accumulation amount of the sensor data related to the each of the relay communication methods.

* * * * *